(12) United States Patent
Fiske et al.

(10) Patent No.: US 9,704,441 B2
(45) Date of Patent: Jul. 11, 2017

(54) SYSTEM AND METHOD TO ADJUST DISPLAYED PRIMARY COLORS BASED ON ILLUMINATION

(71) Applicant: SnapTrack, Inc., San Diego, CA (US)

(72) Inventors: Thomas Gerald Fiske, Campbell, CA (US); Difei Qi, Boyds, MD (US); Shen-Ge Wang, Milpitas, CA (US)

(73) Assignee: SnapTrack, Inc., San Diego, CA (US)

( * ) Notice: Subject to any disclaimer, the term of this patent is extended or adjusted under 35 U.S.C. 154(b) by 66 days.

(21) Appl. No.: 14/613,968

(22) Filed: Feb. 4, 2015

(65) Prior Publication Data
US 2016/0225326 A1    Aug. 4, 2016

(51) Int. Cl.
G09G 3/34       (2006.01)
G02F 1/21       (2006.01)
G09G 5/06       (2006.01)

(52) U.S. Cl.
CPC ............ *G09G 3/3413* (2013.01); *G02F 1/21* (2013.01); *G09G 3/346* (2013.01); *G09G 3/3466* (2013.01); *G09G 5/06* (2013.01); G09G 2320/0242 (2013.01); G09G 2320/0666 (2013.01); G09G 2320/08 (2013.01); G09G 2340/06 (2013.01); G09G 2360/144 (2013.01); G09G 2360/145 (2013.01)

(58) Field of Classification Search
CPC .... G09G 3/3413; G09G 3/346; G09G 3/3466; G09G 3/3446; G09G 5/06
See application file for complete search history.

(56) References Cited

U.S. PATENT DOCUMENTS

| 8,130,235 B2 | 3/2012 | Marcinkiewicz |
| 2006/0256257 A1* | 11/2006 | Nakano ............. G02F 1/133621 349/80 |
| 2007/0171218 A1* | 7/2007 | Hong ................... G09G 3/3406 345/211 |
| 2008/0303918 A1 | 12/2008 | Keithley |
| 2011/0199350 A1 | 8/2011 | Wilson |
| 2013/0027444 A1 | 1/2013 | Chui et al. |
| 2013/0050165 A1 | 2/2013 | Northway et al. |
| 2013/0271437 A1 | 10/2013 | Webster et al. |
| 2014/0063039 A1 | 3/2014 | Drzaic |
| 2014/0191981 A1 | 7/2014 | Ramasarma et al. |
| 2014/0210802 A1 | 7/2014 | Myers et al. |
| 2014/0285477 A1 | 9/2014 | Cho et al. |

FOREIGN PATENT DOCUMENTS

EP        1282099 A2     2/2003

OTHER PUBLICATIONS

International Search Report and Written Opinion—PCT/US2015/064259—ISA/EPO—Feb. 19, 2016.

\* cited by examiner

*Primary Examiner* — Antonio A Caschera
(74) *Attorney, Agent, or Firm* — Knobbe, Martens, Olson & Bear, LLP

(57) ABSTRACT

Systems, methods and apparatus, including computer programs encoded on computer storage media, for displaying images with consistent color performance on display devices including display elements that have multiple primary colors under different illumination conditions are described. The systems, methods and apparatus described herein can be configured to select between different sets of primary colors for different illumination conditions.

18 Claims, 10 Drawing Sheets

Common Voltages

| Segment Voltages | | $VC_{ADD\_H}$ | $VC_{HOLD\_H}$ | $VC_{REL}$ | $VC_{HOLD\_L}$ | $VC_{ADD\_L}$ |
|---|---|---|---|---|---|---|
| | $VS_H$ | Stable | Stable | Relax | Stable | Actuate |
| | $VS_L$ | Actuate | Stable | Relax | Stable | Stable |

{# SYSTEM AND METHOD TO ADJUST DISPLAYED PRIMARY COLORS BASED ON ILLUMINATION

TECHNICAL FIELD

This disclosure relates to methods and systems for adjusting the displayed primary colors based on illumination.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

Some display devices, such as, for example EMS systems based display devices, can produce a color by utilizing more than three primary colors. Each of the primary colors can have reflectance or transmittance characteristics that are independent of each other. Such devices can be referred to as multi-primary display devices. The color performance of a reflective EMS display device can change based on the spectral power distribution (SPD) of light incident on the EMS display device.

SUMMARY

The systems, methods and devices of this disclosure each have several innovative aspects, no single one of which is solely responsible for the desirable attributes disclosed herein.

One innovative aspect of the subject matter described in this disclosure can be implemented in a display device comprising at least one display element capable of displaying a first set of N adjustable primary colors in a color space associated with the display device when under illumination by a first illumination source and a processor. The N adjustable primary colors are associated with N different values of a device parameter of the display element that can be adjusted to provide the first set of N adjustable primary colors. The processor is configured to detect a change in the nature of the illumination when the at least one display element is illuminated by light from a second illumination source. The processor is further configured to adjust at least some of the N different values of the device parameter such that the display element is capable of displaying a second set of N adjustable primary colors in the color space associated with the display device when illuminated by light from at least the second illumination source. The second set of N adjustable primary colors displayed by the display element when illuminated by light from at least the second illumination source is substantially perceptually similar to the first set of N adjustable primary colors when illuminated by light from the first illumination source.

In various embodiments, the values of the device parameters corresponding to the N adjustable primary colors in the first set and the N adjustable primary colors in the second set can be stored in a look-up table (LUT) that can be accessed by the processor. In various embodiments, the display device can include a front light source configured to illuminate the at least one display element. In various embodiments, the first illumination source can be ambient light, and the second illumination source can be the front light source. In various embodiments, the processor can be configured to detect a change in the nature of illumination by determining an illumination state of the front light source. In various embodiments, the display element can include a movable reflective layer disposed over a substrate. The movable reflective layer can be spaced apart from the substrate by a gap. In various embodiments, the device parameter can correspond to a height of the gap. Each of the N adjustable primary colors in the first set can have a corresponding primary color in the second set such that a color different $\Delta C$ in a standard color space between a primary color in the first set having a color value $C_{1N}$ in the standard color space and a corresponding primary color in the second set having a color value $C_{2N}$ in the standard color space is less than a threshold value. Various embodiments of the display device can include a sensor in electronic communication with the processor. The sensor can be configured to sense the nature of the illumination source. The sensor can be a color sensor.

Another innovative aspect of the subject matter described in this disclosure can be implemented in a method of displaying image data on a display device including at least one display element. The at least one display element is capable of displaying a first set of N adjustable primary colors in a color space associated with the display device when under illumination by light from a first illumination source. The N adjustable primary colors are associated with N different values of a device parameter of the at least one display element that are adjusted to provide the first set of N adjustable primary colors. The method comprises detecting a change in the nature of the illumination when the at least one display element is illuminated by light from at least a second illumination source; and adjusting at least some of the N different values of the device parameter such that the display element is capable of displaying a second set of N adjustable primary colors in the color space associated with the display device when illuminated by light from at least the second illumination source. The method is performed under control of an electronic processing circuit associated with the display device. The second set of N adjustable primary colors displayed by the display element when illuminated by light from at least the second illumination source is substantially perceptually similar to the first set of N adjustable primary colors when illuminated by light from the first illumination source.

In various implementations of the method, detecting a change in the nature of the illumination can include determining an illumination state of a front light source associated with the display device. In various implementations of the method, detecting a change in the nature of the illumination can include sensing a change in the spectral content of light illuminating the at least one display element. In various implementations of the method, adjusting some of the N different values of the device parameter can include accessing a look-up table (LUT) accessible by the electronic processing circuit to obtain N different values of the device parameters corresponding to the N adjustable primary colors in the second set. In various implementations, the display element includes a movable reflective layer disposed over a substrate and spaced apart from the substrate by a gap. In such implementations, the device parameter can be a height of the gap and adjusting the N different values of the device parameter can include changing a value of an electrical signal applied to the display element to adjust the height of the gap. In various implementations of the method, adjusting the N different values of the device parameter can include sensing a change in a spectral content of the light illuminating the at least one device element and changing the device parameters of at least some of the display elements to generate a second set of N adjustable primary colors.

Another innovative aspect of the subject matter described in this disclosure can be implemented a non-transitory computer storage medium comprising instructions that when executed by a processor cause the processor to perform a method of displaying image data on a display device including at least one display element. The at least one display element is capable of displaying a first set of N adjustable primary colors in a color space associated with the display device when under illumination by light from a first illumination source. The N adjustable primary colors are associated with N different values of a device parameter of the at least one display element that can be adjusted to provide the first set of N adjustable primary colors. The method comprises detecting a change in the nature of the illumination when the at least one display element is illuminated by light from at least a second illumination source; and adjusting at least some of the N different values of the device parameter such that the display element is capable of displaying a second set of N adjustable primary colors in the color space associated with the display device when illuminated by light from at least the second illumination source. The method is performed under control of an electronic processing circuit associated with the display device. The second set of N adjustable primary colors displayed by the display element when illuminated by light from at least the second illumination source is substantially perceptually similar to the first set of N adjustable primary colors when illuminated by light from the first illumination source.

In various implementations, detecting a change in the nature of the illumination can include determining an illumination state of a front light source associated with the display device. In some implementations, detecting a change in the nature of the illumination can include sensing a change in the spectral content of light illuminating the at least one display element. In various implementations, adjusting at least some of the N different values of the device parameter can include accessing a look-up table (LUT) that is accessible by the electronic processing circuit to obtain values of the device parameters corresponding to the N adjustable primary colors in the second set.

Details of one or more implementations of the subject matter described in this disclosure are set forth in the accompanying drawings and the description below. Although the examples provided in this disclosure are primarily described in terms of EMS and MEMS-based displays the concepts provided herein may apply to other types of displays such as liquid crystal displays, organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
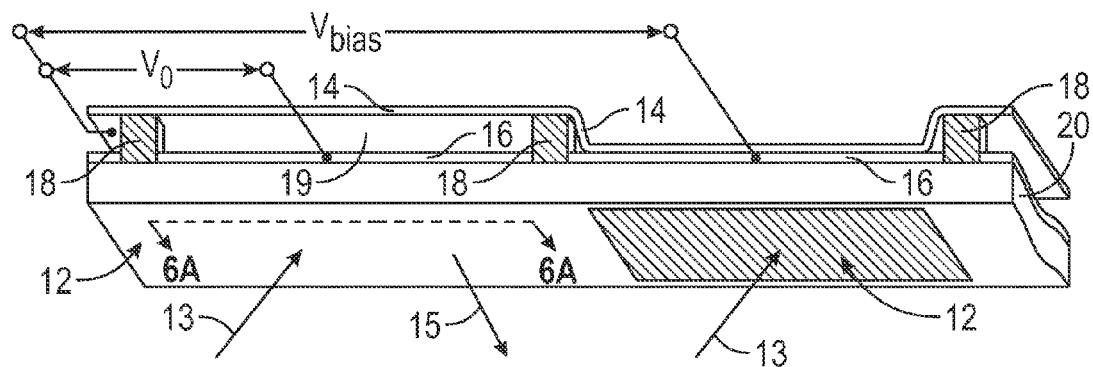
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various systems and methods described herein can be used to reduce a color shift in the displayed images when viewed in different lighting conditions. For example, the implementations of the display devices can be configured to detect a change in the nature of illumination and adjust one or more device parameters to change the displayed primary color. Various implementations of the display device disclosed herein can include a spectral sensor that can detect a change in the spectral power distribution (SPD) of the light incident on the display device and adjust one or more device parameters of the display device to adjust the displayed primary color. A device parameter can be, for example, a voltage that corresponds to a position of a reflective element in the display device. In some implementations, the display device can be configured to select between a first set of primary colors and a second set of primary based at least in part on whether a front light is turned on or off (or on a degree of illumination provided by the front light). The implementations of the display devices disclosed herein can include one or more processors that can access a look-up table (LUT) configured to store different values of the one or more device parameters that result in primary colors with different selections. The one or more processors can be configured to access the LUT and select the appropriate device parameters that would result in the appropriate primary colors to be displayed based on the illumination.

The subject matter described in this disclosure can be implemented in various ways to realize one or more of the following potential advantages. Generally, one or more color perceptions (e.g., tone, grayscale, hue, chroma, saturation, brightness, lightness, luminance, correlated color temperature, dominant wavelength, or a coordinate in the color space associated with the display element) of various colors displayed by a reflective display device can vary as the light illuminating the display device changes its spectral content, brightness and/or color temperature of the illumination. This change of the displayed colors can result in undesirable visual effects as the illumination conditions change. For example, the color performance may be degraded as the display device transitions from a high ambient light environment to a low ambient light environment and a front light is used to view the display device. The systems and methods described herein can provide consistent color performance for different lighting conditions by adjusting the primary colors produced by the display device when the illumination conditions change. For example, the selection of the primary colors produced by the implementations of the display device disclosed herein can be changed when the display device transitions from a high ambient light environment to a low ambient light environment and a front light is used to view the display device. Since, the systems and methods described herein include features that achieve consistent color performance by adjusting primary colors for different illumination sources, existing implementations of light sources can be used as auxiliary sources of illumination to obtain similar color performance to standard day light illumination. Furthermore, consistent color performance can be achieved under various lighting conditions without the requiring different dithering methods to render images under different lighting conditions. The systems and methods described herein can be configured to automatically adjust one or more of the primary colors upon detecting a change in the lighting conditions without requiring any input from the user. Accordingly, the viewing experience of the user is seamless and not compromised when the user transitions from one lighting environment to another.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage Vbias applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage V0 applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 μm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
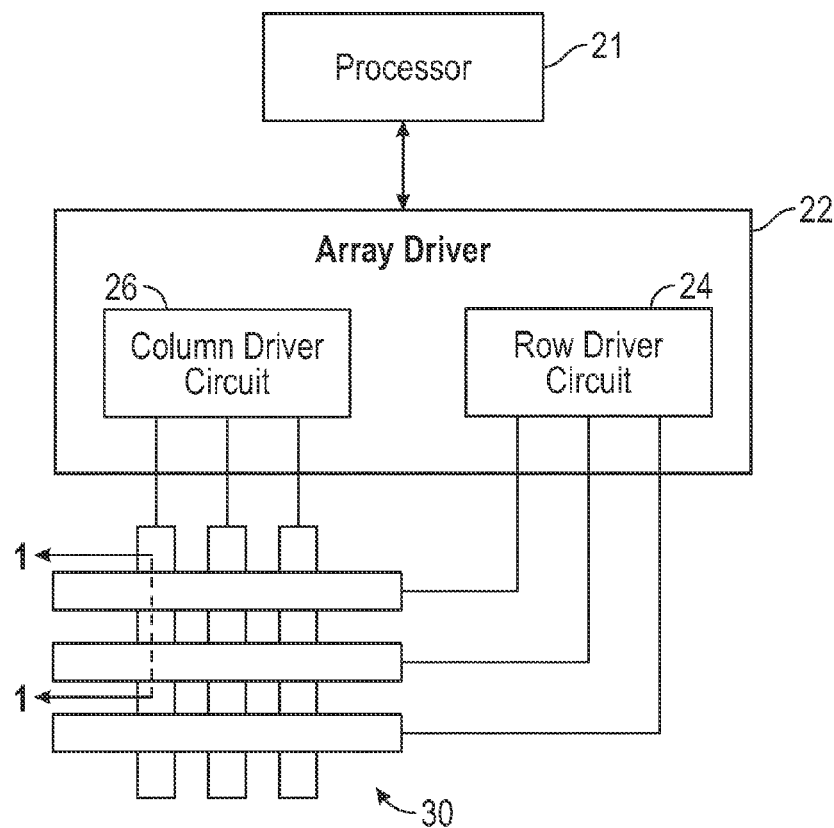
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figures 3, 4:
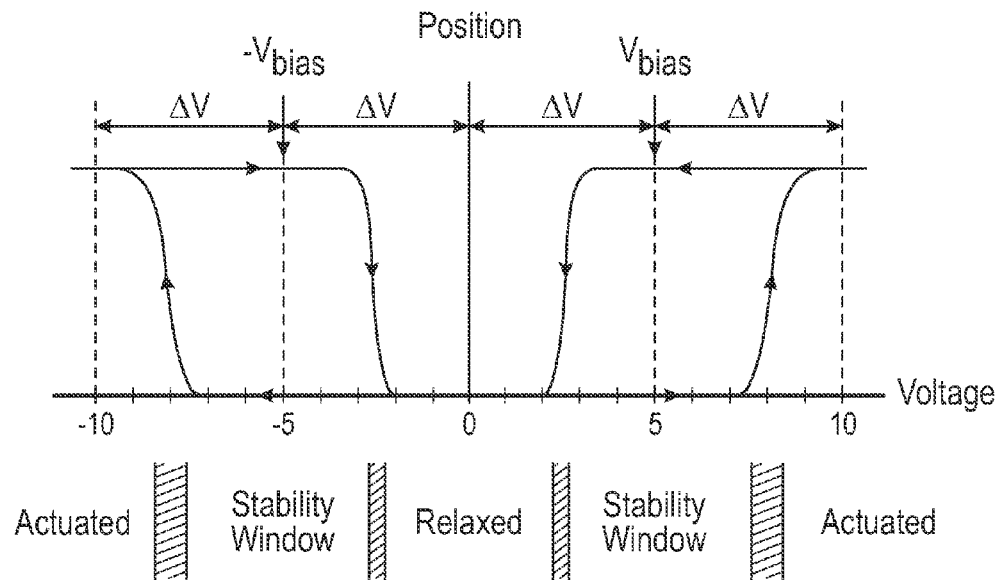
FIG. 3 is a graph illustrating movable reflective layer position versus applied voltage for an IMOD display element.
FIG. 4 is a table illustrating various states of an IMOD display element when various common and segment voltages are applied.

FIG. 3 is a graph illustrating movable reflective layer position versus applied voltage for an IMOD display element. For IMODs, the row/column (i.e., common/segment) write procedure may take advantage of a hysteresis property of the display elements as illustrated in FIG. 3. An IMOD display element may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3-7 volts, in the example of FIG. 3, exists where there is a window of applied voltage within which the element is stable in either the relaxed or actuated state. This is referred to herein as the "hysteresis window" or "stability window." For a display array 30 having the hysteresis characteristics of FIG. 3, the row/column write procedure can be designed to address one or more rows at a time. Thus, in this example, during the addressing of a given row, display elements that are to be actuated in the addressed row can be exposed to a voltage difference of about 10 volts, and display elements that are to be relaxed can be exposed to a voltage difference of near zero volts. After addressing, the display elements can be exposed to a steady state or bias voltage difference of approximately 5 volts in this example, such that they remain in the previously strobed, or written, state. In this example, after being addressed, each display element sees a potential difference within the "stability window" of about 3-7 volts. This hysteresis property feature enables the IMOD display element design to remain stable in either an actuated or relaxed pre-existing state under the same applied voltage conditions. Since each IMOD display element, whether in the actuated or relaxed state, can serve as a capacitor formed by the fixed and moving reflective layers, this stable state can be held at a steady voltage within the hysteresis window without substantially consuming or losing power. Moreover, essentially little or no current flows into the display element if the applied voltage potential remains substantially fixed.

In some implementations, a frame of an image may be created by applying data signals in the form of "segment" voltages along the set of column electrodes, in accordance with the desired change (if any) to the state of the display elements in a given row. Each row of the array can be addressed in turn, such that the frame is written one row at a time. To write the desired data to the display elements in a first row, segment voltages corresponding to the desired state of the display elements in the first row can be applied on the column electrodes, and a first row pulse in the form of a specific "common" voltage or signal can be applied to the first row electrode. The set of segment voltages can then be changed to correspond to the desired change (if any) to the state of the display elements in the second row, and a second common voltage can be applied to the second row electrode. In some implementations, the display elements in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each display element (that is, the potential difference across each display element or pixel) determines the resulting state of each display element. FIG. 4 is a table illustrating various states of an IMOD display element when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4, when a release voltage VCREL is applied along a common line, all IMOD display elements along the common line will be placed in a relaxed state, alternatively referred to as a released or unactuated state, regardless of the voltage applied along the segment lines, i.e., high segment voltage VSH and low segment voltage VSL. In particular, when the release voltage VCREL is applied along a common line, the potential voltage across the modulator display elements or pixels (alternatively referred to as a display element or pixel voltage) can be within the relaxation window (see FIG. 3, also referred to as a release window) both when the high segment voltage VSH and the low segment voltage VSL are applied along the corresponding segment line for that display element.

When a hold voltage is applied on a common line, such as a high hold voltage VCHOLD_H or a low hold voltage VCHOLD_L, the state of the IMOD display element along that common line will remain constant. For example, a relaxed IMOD display element will remain in a relaxed position, and an actuated IMOD display element will remain in an actuated position. The hold voltages can be selected such that the display element voltage will remain within a stability window both when the high segment voltage VSH and the low segment voltage VSL are applied along the corresponding segment line. Thus, the segment voltage swing in this example is the difference between the high VSH and low segment voltage VSL, and is less than the width of either the positive or the negative stability window.

When an addressing, or actuation, voltage is applied on a common line, such as a high addressing voltage VCADD_H or a low addressing voltage VCADD_L, data can be selectively written to the modulators along that common line by application of segment voltages along the respective segment lines. The segment voltages may be selected such that actuation is dependent upon the segment voltage applied. When an addressing voltage is applied along a common line, application of one segment voltage will result in a display element voltage within a stability window, causing the display element to remain unactuated. In contrast, application of the other segment voltage will result in a display element voltage beyond the stability window, resulting in actuation of the display element. The particular segment voltage which causes actuation can vary depending upon which addressing voltage is used. In some implementations, when the high addressing voltage VCADD_H is applied along the common line, application of the high segment voltage VSH can cause a modulator to remain in its current position, while application of the low segment voltage VSL can cause actuation of the modulator. As a corollary, the effect of the segment voltages can be the opposite when a low addressing voltage VCADD_L is applied, with high segment voltage VSH causing actuation of the modulator, and low segment voltage VSL having substantially no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation that could occur after repeated write operations of a single polarity.

Figure 5:
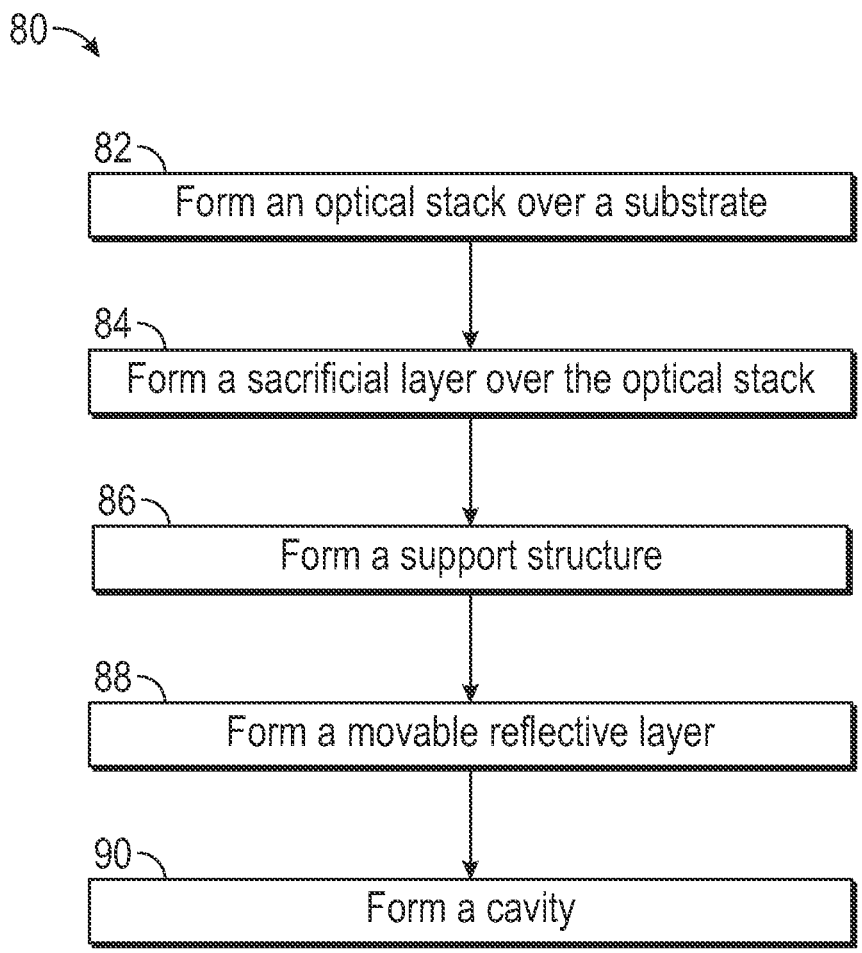
FIG. 5 is a flow diagram illustrating a manufacturing process for an IMOD display or display element.
Figure 6A:
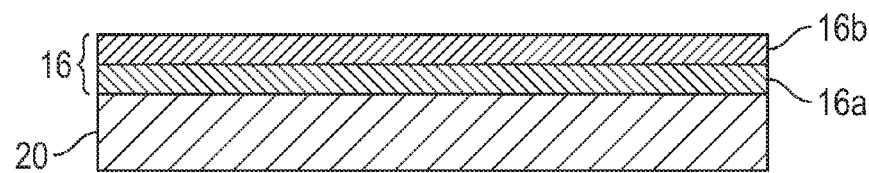
FIGS. 6A-6E are cross-sectional illustrations of various stages in a process of making an IMOD display or display element.

FIG. 5 is a flow diagram illustrating a manufacturing process 80 for an IMOD display or display element. FIGS. 6A-6E are cross-sectional illustrations of various stages in the manufacturing process 80 for making an IMOD display or display element. In some implementations, the manufacturing process 80 can be implemented to manufacture one or more EMS devices, such as IMOD displays or display elements. The manufacture of such an EMS device also can include other blocks not shown in FIG. 5. The process 80 begins at block 82 with the formation of the optical stack 16 over the substrate 20. FIG. 6A illustrates such an optical stack 16 formed over the substrate 20. The substrate 20 may be a transparent substrate such as glass or plastic such as the materials discussed above with respect to FIG. 1. The substrate 20 may be flexible or relatively stiff and unbending, and may have been subjected to prior preparation processes, such as cleaning, to facilitate efficient formation of the optical stack 16. As discussed above, the optical stack 16 can be electrically conductive, partially transparent, partially reflective, and partially absorptive, and may be fabricated, for example, by depositing one or more layers having the desired properties onto the transparent substrate 20.

In FIG. 6A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, such as the combined conductor/absorber sub-layer 16a. In some implementations, one of the sub-layers 16a and 16b can include molybdenum-chromium (molychrome or MoCr), or other materials with a suitable complex refractive index. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as an upper sub-layer 16b that is deposited over one or more underlying metal and/or oxide layers (such as one or more reflective and/or conductive layers). In addition, the optical stack 16 can be patterned into individual and parallel strips that form the rows of the display. In some implementations, at least one of the sub-layers of the optical stack, such as the optically absorptive layer, may be quite thin (e.g., relative to other layers depicted in this disclosure), even though the sub-layers 16a and 16b are shown somewhat thick in FIGS. 6A-6E.

Figure 6B:
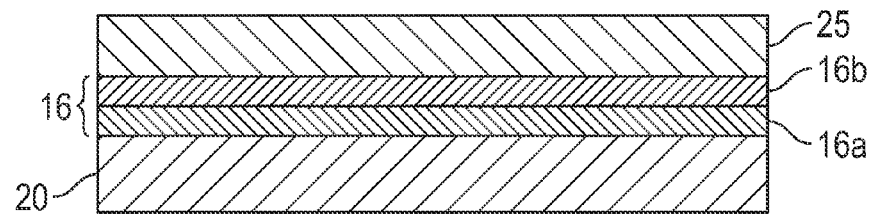

The process 80 continues at block 84 with the formation of a sacrificial layer 25 over the optical stack 16. Because the sacrificial layer 25 is later removed (see block 90) to form the cavity 19, the sacrificial layer 25 is not shown in the resulting IMOD display elements. FIG. 6B illustrates a partially fabricated device including a sacrificial layer 25 formed over the optical stack 16. The formation of the sacrificial layer 25 over the optical stack 16 may include deposition of a xenon difluoride (XeF2)-etchable material such as molybdenum (Mo) or amorphous silicon (Si), in a thickness selected to provide, after subsequent removal, a gap or cavity 19 (see also FIG. 6E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 6C:
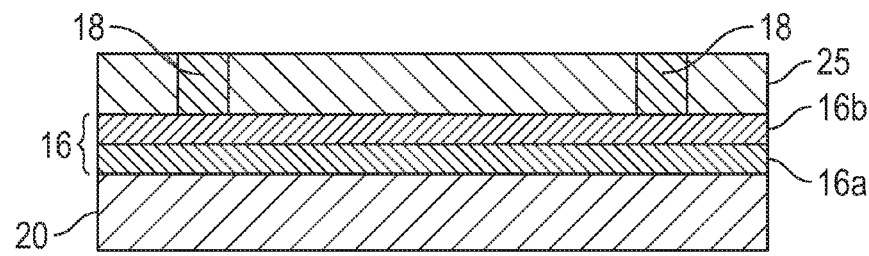

The process 80 continues at block 86 with the formation of a support structure such as a support post 18. The formation of the support post 18 may include patterning the sacrificial layer 25 to form a support structure aperture, then depositing a material (such as a polymer or an inorganic material, like silicon oxide) into the aperture to form the support post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the support post 18 contacts the substrate 20. Alternatively, as depicted in FIG. 6C, the aperture formed in the sacrificial layer 25 can extend through the sacrificial layer 25, but not through the optical stack 16. For example, FIG. 6E illustrates the lower ends of the support posts 18 in contact with an upper surface of the optical stack 16. The support post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 6C, but also can extend at least partially over a portion of the sacrificial layer 25. As noted above, the patterning of the sacrificial layer 25 and/or the support posts 18 can be performed by a masking and etching process, but also may be performed by alternative patterning methods.

Figure 6D:
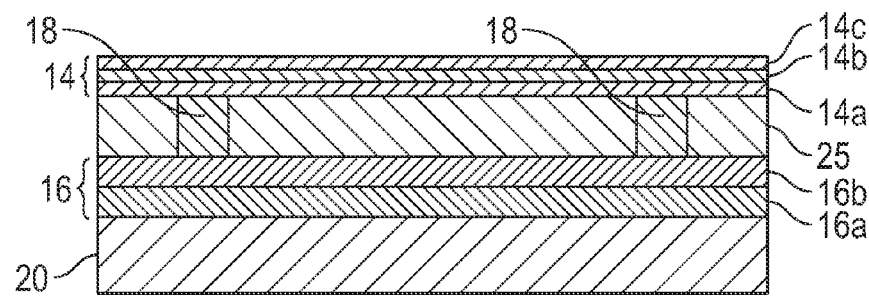
Figure 6E:
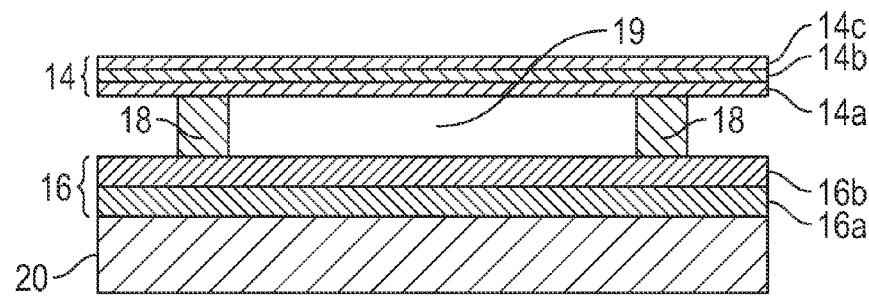

The process 80 continues at block 88 with the formation of a movable reflective layer or membrane such as the movable reflective layer 14 illustrated in FIG. 6D. The movable reflective layer 14 may be formed by employing one or more deposition steps, including, for example, reflective layer (such as aluminum, aluminum alloy, or other reflective materials) deposition, along with one or more patterning, masking and/or etching steps. The movable reflective layer 14 can be patterned into individual and parallel strips that form, for example, the columns of the display. The movable reflective layer 14 can be electrically conductive, and referred to as an electrically conductive layer. In some implementations, the movable reflective layer 14 may include a plurality of sub-layers 14a, 14b and 14c as shown in FIG. 6D. In some implementations, one or more of the sub-layers, such as sub-layers 14a and 14c, may include highly reflective sub-layers selected for their optical properties, and another sub-layer 14b may include a mechanical sub-layer selected for its mechanical properties. In some implementations, the mechanical sub-layer may include a dielectric material. Since the sacrificial layer 25 is still present in the partially fabricated IMOD display element formed at block 88, the movable reflective layer 14 is typically not movable at this stage. A partially fabricated IMOD display element that contains a sacrificial layer 25 also may be referred to herein as an "unreleased" IMOD.

The process 80 continues at block 90 with the formation of a cavity 19. The cavity 19 may be formed by exposing the sacrificial material 25 (deposited at block 84) to an etchant. For example, an etchable sacrificial material such as Mo or amorphous Si may be removed by dry chemical etching by exposing the sacrificial layer 25 to a gaseous or vaporous etchant, such as vapors derived from solid XeF2 for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD display element may be referred to herein as a "released" IMOD.

In some implementations, the packaging of an EMS component or device, such as an IMOD-based display, can include a backplate (alternatively referred to as a backplane, back glass or recessed glass) which can be configured to protect the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

Figure 7A:
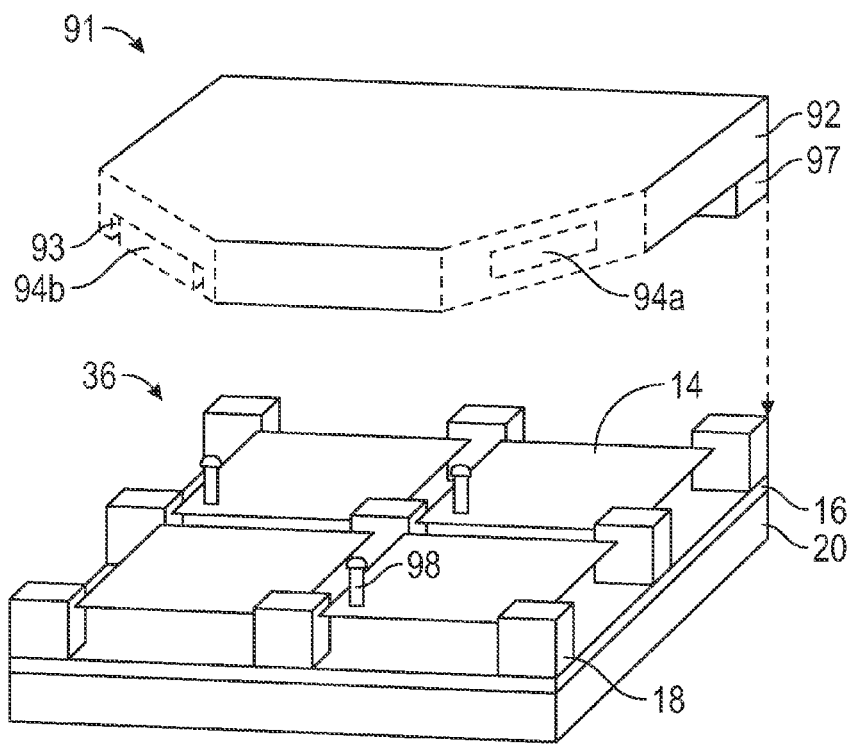
FIGS. 7A and 7B are schematic exploded partial perspective views of a portion of an electromechanical systems (EMS) package including an array of EMS elements and a backplate.
Figure 7B:
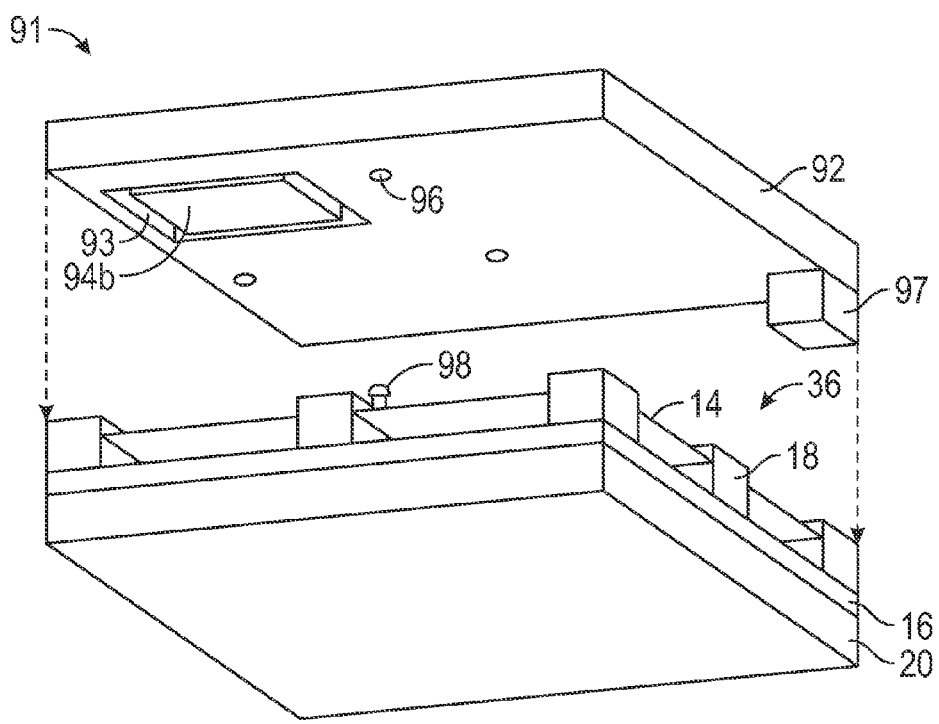

FIGS. 7A and 7B are schematic exploded partial perspective views of a portion of an EMS package 91 including an array 36 of EMS elements and a backplate 92. FIG. 7A is shown with two corners of the backplate 92 cut away to better illustrate certain portions of the backplate 92, while FIG. 7B is shown without the corners cut away. The EMS array 36 can include a substrate 20, support posts 18, and a movable layer 14. In some implementations, the EMS array 36 can include an array of IMOD display elements with one or more optical stack portions 16 on a transparent substrate, and the movable layer 14 can be implemented as a movable reflective layer.

The backplate 92 can be essentially planar or can have at least one contoured surface (e.g., the backplate 92 can be formed with recesses and/or protrusions). The backplate 92 may be made of any suitable material, whether transparent or opaque, conductive or insulating. Suitable materials for the backplate 92 include, but are not limited to, glass, plastic, ceramics, polymers, laminates, metals, metal foils, Kovar and plated Kovar.

As shown in FIGS. 7A and 7B, the backplate 92 can include one or more backplate components 94a and 94b, which can be partially or wholly embedded in the backplate 92. As can be seen in FIG. 7A, backplate component 94a is embedded in the backplate 92. As can be seen in FIGS. 7A and 7B, backplate component 94b is disposed within a recess 93 formed in a surface of the backplate 92. In some implementations, the backplate components 94a and/or 94b can protrude from a surface of the backplate 92. Although backplate component 94b is disposed on the side of the backplate 92 facing the substrate 20, in other implementations, the backplate components can be disposed on the opposite side of the backplate 92.

The backplate components 94a and/or 94b can include one or more active or passive electrical components, such as transistors, capacitors, inductors, resistors, diodes, switches, and/or integrated circuits (ICs) such as a packaged, standard or discrete IC. Other examples of backplate components that can be used in various implementations include antennas, batteries, and sensors such as electrical, touch, optical, or chemical sensors, or thin-film deposited devices.

In some implementations, the backplate components 94a and/or 94b can be in electrical communication with portions of the EMS array 36. Conductive structures such as traces, bumps, posts, or vias may be formed on one or both of the backplate 92 or the substrate 20 and may contact one another or other conductive components to form electrical connections between the EMS array 36 and the backplate components 94a and/or 94b. For example, FIG. 7B includes one or more conductive vias 96 on the backplate 92 which can be aligned with electrical contacts 98 extending upward from the movable layers 14 within the EMS array 36. In some implementations, the backplate 92 also can include one or more insulating layers that electrically insulate the backplate components 94a and/or 94b from other components of the EMS array 36. In some implementations in which the backplate 92 is formed from vapor-permeable materials, an interior surface of backplate 92 can be coated with a vapor barrier (not shown).

The backplate components 94a and 94b can include one or more desiccants which act to absorb any moisture that may enter the EMS package 91. In some implementations, a desiccant (or other moisture absorbing materials, such as a getter) may be provided separately from any other backplate components, for example as a sheet that is mounted to the backplate 92 (or in a recess formed therein) with adhesive. Alternatively, the desiccant may be integrated into the backplate 92. In some other implementations, the desiccant may be applied directly or indirectly over other backplate components, for example by spray-coating, screen printing, or any other suitable method.

In some implementations, the EMS array 36 and/or the backplate 92 can include mechanical standoffs 97 to maintain a distance between the backplate components and the display elements and thereby prevent mechanical interference between those components. In the implementation illustrated in FIGS. 7A and 7B, the mechanical standoffs 97 are formed as posts protruding from the backplate 92 in alignment with the support posts 18 of the EMS array 36. Alternatively or in addition, mechanical standoffs, such as rails or posts, can be provided along the edges of the EMS package 91.

Although not illustrated in FIGS. 7A and 7B, a seal can be provided which partially or completely encircles the EMS array 36. Together with the backplate 92 and the substrate 20, the seal can form a protective cavity enclosing the EMS array 36. The seal may be a semi-hermetic seal, such as a conventional epoxy-based adhesive. In some other implementations, the seal may be a hermetic seal, such as a thin film metal weld or a glass frit. In some other implementations, the seal may include polyisobutylene (PIB), polyurethane, liquid spin-on glass, solder, polymers, plastics, or other materials. In some implementations, a reinforced sealant can be used to form mechanical standoffs.

In alternate implementations, a seal ring may include an extension of either one or both of the backplate 92 or the substrate 20. For example, the seal ring may include a mechanical extension (not shown) of the backplate 92. In some implementations, the seal ring may include a separate member, such as an O-ring or other annular member.

In some implementations, the EMS array 36 and the backplate 92 are separately formed before being attached or coupled together. For example, the edge of the substrate 20 can be attached and sealed to the edge of the backplate 92 as discussed above. Alternatively, the EMS array 36 and the backplate 92 can be formed and joined together as the EMS package 91. In some other implementations, the EMS package 91 can be fabricated in any other suitable manner, such as by forming components of the backplate 92 over the EMS array 36 by deposition.

Various implementations of a multi-primary display device can include the EMS array 36. The EMS elements in the array can include one or more IMODs. In some implementations the IMOD can include an analog IMOD (AIMOD). The AIMOD may be configured to selectively reflect multiple primary colors and provide 1 bit per color.

Figure 8:
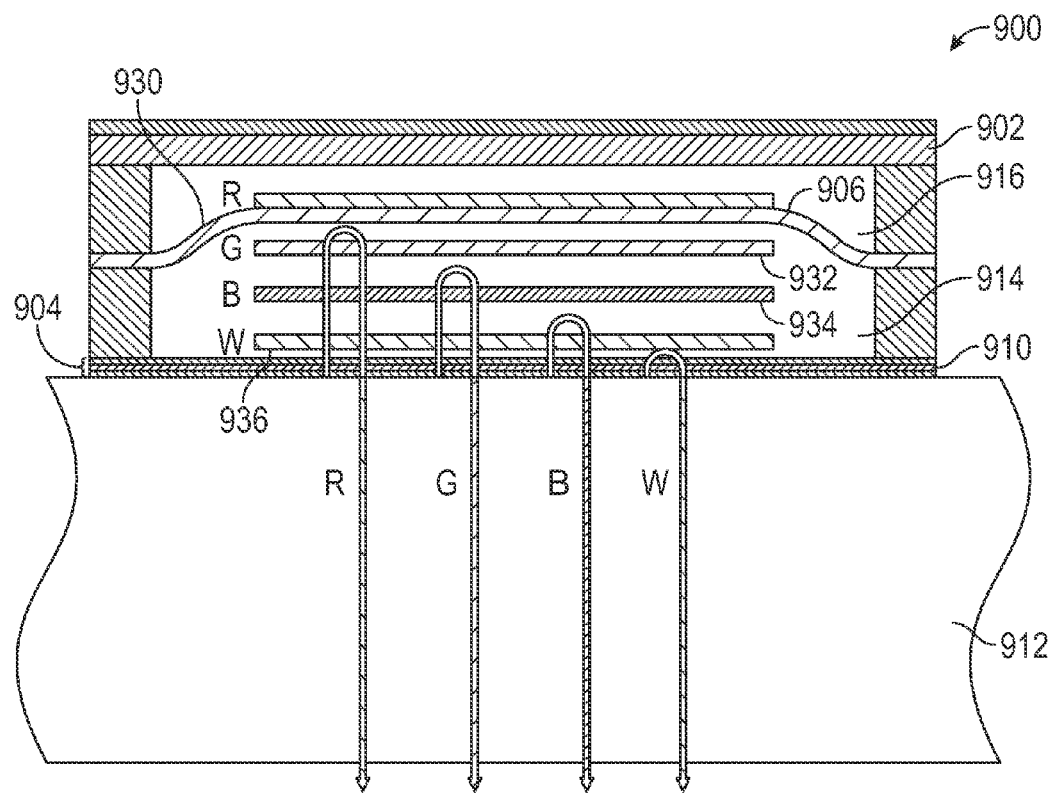
FIG. 8 shows a cross-section of an implementation of an analog IMOD (AIMOD).

FIG. 8 shows a cross-section of an implementation of an AIMOD. The AIMOD 900 includes a substrate 912 and an optical stack 904 disposed over the substrate 912. The AIMOD includes a first electrode 910 and a second electrode 902 (as illustrated, the first electrode 910 is a lower electrode, and second electrode 902 is an upper electrode). The AIMOD 900 also includes a movable reflective layer 906 disposed between the first electrode 910 and the second electrode 902. In some implementations, the optical stack 904 includes an absorbing layer, and/or a plurality of other layers. In some implementations, and in the example illustrated in FIG. 8, the optical stack 904 includes the first electrode 910 which is configured as an absorbing layer. In such a configuration, the absorbing layer (first electrode 910) can be an approximately 6 nm layer of material that includes MoCr. In some implementations, the absorbing layer (that is, the first electrode 910) can be a layer of material including MoCr with a thickness ranging from approximately 2 nm to 50 nm.

The reflective layer 906 can be actuated toward either the first electrode 910 or the second electrode 902 when a voltage is applied between the first and second electrodes 910 and 902. In this manner, the reflective layer 906 can be driven through a range of positions between the two electrodes 902 and 910, including above and below a relaxed (unactuated) state. For example, FIG. 8 illustrates that the reflective layer 906 can be moved to various positions 930, 932, 934 and 936 between the first electrode 910 and the second electrode 902.

The AIMOD 900 in FIG. 8 has two structural cavities, a first cavity 914 between the reflective layer 906 and the optical stack 904, and a second cavity 916 between the reflective layer 906 and the second electrode 902. In various implementations, the first cavity 914 and/or the second cavity can include air. The color and/or intensity of light reflected by the AIMOD 900 is determined by the distance between the reflective layer 906 and the absorbing layer (first electrode 910).

The AIMOD 900 can be configured to selectively reflect certain wavelengths of light depending on the configuration of the AIMOD. The distance between the first electrode 910, which in this implementation acts as an absorbing layer and the reflective layer 906 changes the reflective properties of the AIMOD 900. Any particular wavelength is maximally reflected from the AIMOD 900 when the distance between the reflective layer 906 and the absorbing layer (first electrode 910) is such that the absorbing layer (first electrode 910) is located at the minimum light intensity of standing waves resulting from interference between incident light and light reflected from the reflective layer 906. For example, as illustrated, the AIMOD 900 is designed to be viewed from the substrate 912 side of the AIMOD (through the substrate 912), that is, light enters the AIMOD 900 through the substrate 912. Depending on the position of the reflective layer 906, different wavelengths of light are reflected back through the substrate 912, which gives the appearance of different colors. These different colors are also referred to as native or primary colors. The number of primary colors produced by the AIMOD 900 can be greater than 4. For example, the number of primary colors produced by the AIMOD 900 can be 5, 6, 8, 10, 16, 18, 33, etc.

A position of the movable layer 906 at a location such that it reflects a certain wavelength or wavelengths can be referred to as a display state of the AIMOD 900. For example, when the reflective layer 906 is in position 930, red wavelengths of light are reflected in greater proportion than other wavelengths and the other wavelengths of light are absorbed in greater proportion than red. Accordingly, the AIMOD 900 appears red and is said to be in a red display state, or simply a red state. Similarly, the AIMOD 900 is in a green display state (or green state) when the reflective layer 906 moves to position 932, where green wavelengths of light are reflected in greater proportion than other wavelengths and the other wavelengths of light are absorbed in greater proportion than green. When the reflective layer 906 moves to position 934, the AIMOD 900 is in a blue display state (or blue state) and blue wavelengths of light are reflected in greater proportion than other wavelengths and the other wavelengths of light are absorbed in greater proportion than blue. When the reflective layer 906 moves to a position 936, the AIMOD 900 is in a white display state (or white state) and a broad range of wavelengths of light in the visible spectrum are substantially reflected such that and the AIMOD 900 appears "gray" or in some cases "silver," and having low total reflection (or luminance) when a bare metal reflector is used. In some cases increased total reflection (or luminance) can be achieved with the addition of dielectric layers disposed on the metal reflector, but the reflected color may be tinted with blue, green or yellow, depending on the exact position of 936. In some implementations, in position 936, configured to produce a white state, the distance between the reflective layer 906 and the first electrode 910 is between about 0 and 20 nm. In other implementations, the AIMOD 900 can take on different states and selectively reflect other wavelengths of light based on the position of the reflective layer 906, and also based on materials that are used in construction of the AIMOD 900, particularly various layers in the optical stack 904.

The multiple primary colors displayed by a display element (for example, the AIMOD 900) and the possible color combinations of the multiple primary colors displayed by a display element represent a color space associated with the display element. A color in the color space associated with the display device can be identified by a color level that represents tone, grayscale, hue, chroma, saturation, brightness, lightness, luminance, correlated color temperature, dominant wavelength, or a coordinate in the color space associated with the display element. The color level of one or more colors displayed by display element generally depends on the spectral reflectance function (SRF), which is a measure of the reflectance of the display as a function of wavelength, and the spectral power distribution (SPD) of light incident on the display element. Accordingly, the color level of the one or more colors displayed by display element can change if the SPD of light incident on the display element changes. This change in the color level of the one or more colors displayed by display element can be reduced by changing the SRF of the display element, corresponding to the change of the SPD of light incident on the display. One way of changing the SRF of the display element in an EMS display device (e.g. AIMOD 900) is to change the height of the gap (e.g., cavity 914 and/or cavity 916). Systems and methods described herein are directed towards adjusting one or more device parameters of the display element in order to change the color level of the one or more colors displayed by the display element based on a change in the illumination condition so as to reduce or mitigate changes in the color performance of the display element. Accordingly, the display devices disclosed herein can provide consistent color appearance when the display transitions from one setting having a first illumination condition to another setting having a second illumination condition.

Figure 9:
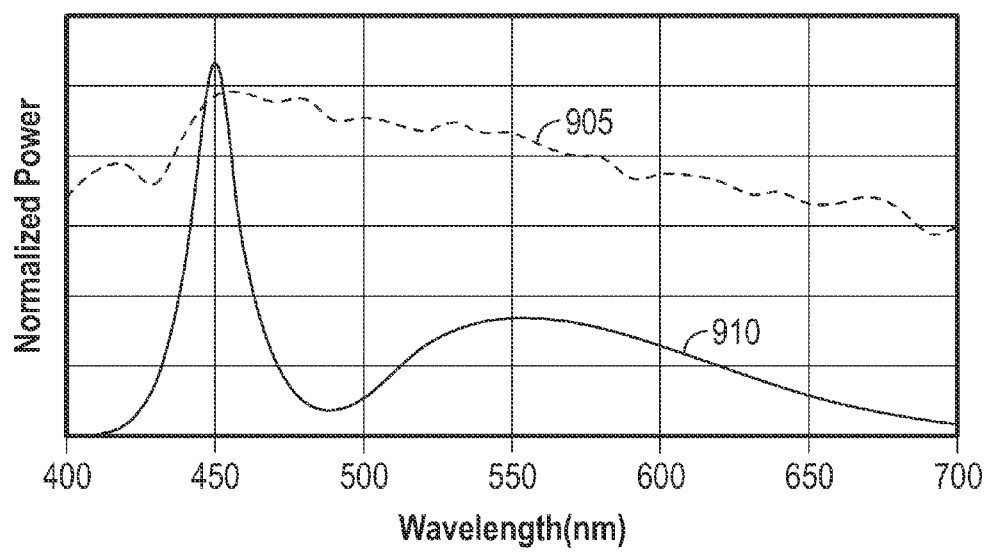
FIG. 9 shows the spectral power density of an implementation of a D65 illumination source and an implementation of a white LED source.

FIG. 9 shows the spectral power density of an implementation of a D65 illumination source and an implementation of a white LED source. The curve 905 represents the SPD of a D65 illuminant (e.g., sunlight at noon) and the curve 910 represents the SPD of a white LED light source that can be used as a front light to illuminate a reflective display element (e.g., the AIMOD 900) when the ambient light is low (e.g., to supplement the ambient light to make the display appear brighter). The illuminants D65 and the white LED light SPD 910 discussed herein are by way of example only and are not intended to limit the types of illuminants that are available for a display element. As observed from curve 905, the SPD of a D65 illuminant is almost uniform across the wavelengths in the spectral range between 450 nm and 700 nm. In contrast, the SPD 910 of a white LED light source exhibits a peak at about 450 nm. Since, the color performance of a display element (e.g., the AIMOD 900) depends on the SPD of the light illuminating the display element, the difference between the SPD of a D65 illuminant and a white LED light source can result in the color performance of a display element (e.g., the AIMOD 900) to change as a user viewing the display element transitions from an environment with high ambient light (e.g., outdoors at noon on a sunny day) when the display element is illuminated by a D65 illuminant to an environment with low ambient light (e.g., indoors or in the outdoors in the evening) when the display element is illuminated by a front light including a white LED light source in addition to the ambient light.

For example, colors displayed by the display element when illuminated by the D65 illuminant can appear vivid, bright or more colorful to the user whereas those colors can appear dull, de-saturated or less colorful to the user when illuminated by a front light including a white LED light source. As another example, some of the colors displayed by the display element can appear to shift when the display element transitions from an environment with high ambient light (e.g., outdoors at noon on a sunny day) when the display element is illuminated by a D65 illuminant to an environment with low ambient light (e.g., indoors or in the outdoors in the evening) when the display element is illuminated by a front light including a white LED light source in addition to the ambient light. These changes in the color performance of the display element for different environments with different lighting conditions can adversely affect a user's viewing experience.

The systems and methods described herein can advantageously reduce or mitigate the differences between the colors displayed by the display element under different illumination conditions. One way to reduce or mitigate the differences between the colors displayed by the display element under different illumination conditions, is to alter the SRF of the display element based on the illumination condition. Since, the color performance of the display element depends on both SRF of the display element and the SPD of the light illuminating the display element, varying the SRF of the display element based on the change of the SPD of the light illuminating, the consistency of the color performance of the display element can be maintained.

As discussed above, one way to change the SRF of a display element including an implementation of an IMOD is to change a height (h) of the gap (e.g., gap 19) of the IMOD. As discussed above, changing the height (h) of the gap of the IMOD changes the SRF of the display element which in turn changes the color displayed by the display element. For example, the display element including an IMOD can display a color $C_1$ associated with a first SRF of the display element, when the height of the gap is $h_1$, and a color $C_2$ associated with a second SRF of the display element, when the height of the gap is $h_2$.

As discussed above, the color space associated with the display device including a display element including an IMOD can include a plurality of primary colors (e.g., at least 4, at least 6, at least 8, at least 10, at least 12, at least 16, at least 24, at least 32, at least 128 or at least 256 primary colors). The plurality of the primary colors can be combined by using spatial and/or temporal dithering methods to display a plurality of more colors. To display the image including a plurality of colors consistently under different illuminating conditions, the display device can be configured to use different sets of primary colors for different illumination conditions. The primary colors in a first set selected from the different sets of primary colors when illuminated by light having a first SPD for which the primary colors in the first set are optimized appear perceptually similar to the primary colors in a second set when illuminated by light having a second SPD for which the primary colors in the second set are optimized. For example, when illuminated by a D65 illuminant, the display device can display the image using a first set of primary colors that are optimized for D65 illuminant and their combinations and when illuminated by a white LED light source, the display device can display the image using a second set of primary colors optimized for the white LED light source and their combinations such that the displayed image perceptually appears to have the same colors under both lighting conditions.

To maintain consistent color performance of the display element under different illuminating conditions, a gap height $h_1$ that produces a primary color $C_1$ can be changed to $h_2$ that produces an adjusted primary color $C_2$ which appears perceptually similar to the primary color $C_1$ when illuminated by light having a second SPD. In various implementations, the gap heights corresponding to all the primary colors in the first set can be adjusted to corresponding heights in the second set to obtain perceptually similar colors when illuminated by light having a second SPD. In other implementations, the gap heights corresponding to some of the primary colors in the first set can be adjusted to the heights in the second set, while gap heights corresponding to other primary colors are the same in the first and the second set.

The gap height $h_2$ that produces the adjusted primary color $C_2$ can be selected by reducing or minimizing a color difference $\Delta C = C_1 - C_2$ in a color space. In various implementations, reducing a color difference between the color $C_1$ displayed by the display element when illuminated by light having the first SPD and the color $C_2$ displayed by the display element when illuminated by light having the second SPD can include reducing or minimizing a color difference $\Delta E^*$ in the International Commission on Illumination (CIE) 1976 (L*, a*, b*) color space (CIELAB) between the colors $C_1$ and $C_2$. The CIELAB color difference $\Delta E^*$ is given by the formula $\Delta E^* = \sqrt{(L_1^* - L_2^*)^2 + (a_1^* - a_2^*)^2 + (b_1^* - b_2^*)^2}$, where $(L_1^*, a_1^*, b_1^*)$ and $(L_2^*, a_2^*, b_2^*)$ are the coordinates of the colors $C_1$ and $C_2$ respectively in the CIELAB color space. In various implementations, the color difference $\Delta E^*$ between the colors $C_1$ and $C_2$ in the CIELAB color space can be less than or equal to a threshold (e.g., about 2.3) such that they appear perceptually similar. In some implementations, the gap height $h_2$ can be selected such that a spatial CIELAB (S-CIELAB) color difference between the primary colors and the colors displayed by the display element using dithering methods such as temporal and/or spatial dithering methods when illuminated by light having a first SPD and primary colors and the colors displayed by the display element using dithering methods such as temporal and/or spatial dithering methods when illuminated by light having a second SPD is reduced or minimized. Spatial CIELAB color difference metric takes into account the visibility of spatial variation in an image based on the spatial detecting properties of the human visual system (HVS). The S-CIELAB color difference can be calculated using the CIELAB $\Delta E^*$ color difference formula discussed above. Other methods of optimizing the primary colors for different lighting conditions can also be used. For example, one method of optimizing the primary colors for different lighting conditions includes maximizing the volume enclosed by the different primary colors in a color space (e.g., the CIELAB color space) for different lighting conditions. Another example of a method of optimizing the primary colors for different lighting conditions includes maximizing the two-dimensional (2D) color gamut area enclosed by the different primary colors for different lighting conditions. Other methods of determining the optimal primary colors for different lighting conditions are also possible.

Figure 10A:
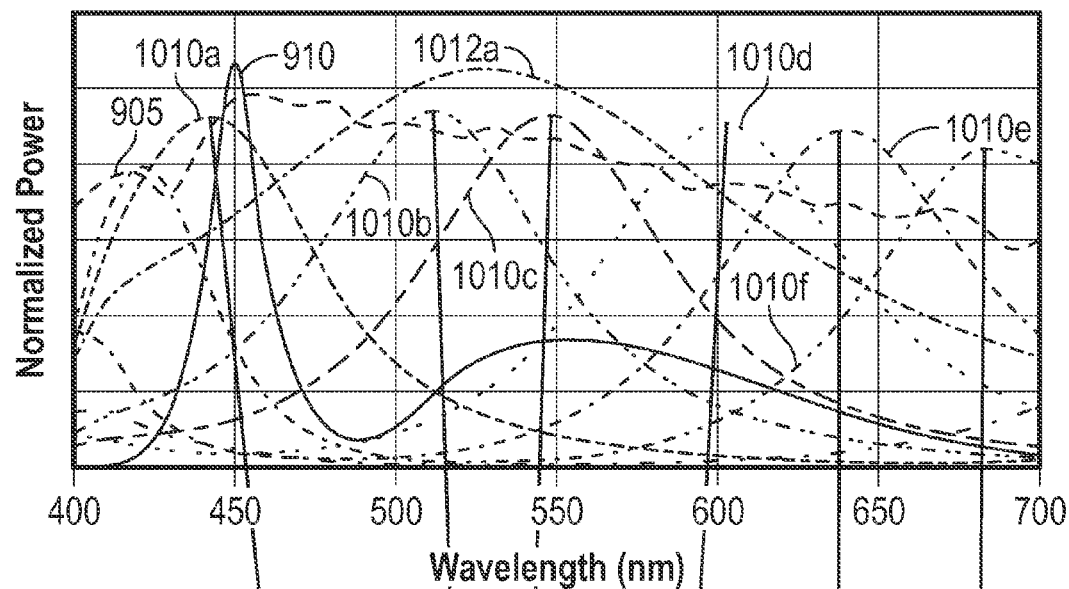
FIG. 10A illustrates an example of the spectral power density of the primary colors included in a first set of primary colors.

FIG. 10A illustrates an example of the spectral power density of the primary colors included in a first set of primary colors. The first set includes seven primary colors having SPD represented by curves 1010a, 1010b, 1010c, 1010d, 1010e, 1010f and 1012a. The first set includes a first primary color having SPD represented by curve 1010a that has a peak in the violet region of the visible spectrum; a second primary color having SPD represented by curve 1010b that has a peak in the blue region of the visible spectrum; a third primary color having SPD represented by curve 1010c that has a peak in the green region of the visible spectrum; a fourth primary color having SPD represented by curve 1010d that has a peak in the orange region of the visible spectrum; a fifth primary color having SPD represented by curve 1010e that has a peak in the red region of the visible spectrum; a sixth primary color having SPD represented by curve 1010f that has a peak in the magenta/purple region of the visible spectrum, and a seventh primary color having SPD represented by curve 1012a that is relatively flat in the visible spectrum and represents the white primary color. The seven different primary colors are selected based on their color performance when the display element is illuminated by a D65 illuminant. Accordingly, the display device can be configured to use the seven different primary colors included in the first set and their combinations to display an image when the display device is illuminated by the D65 illuminant.

Figure 10B:
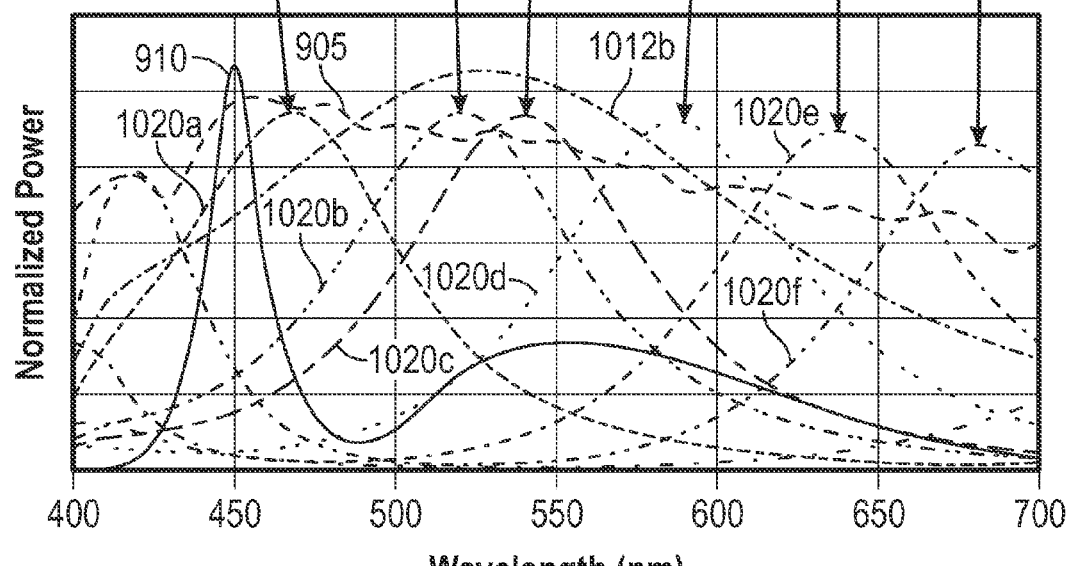
FIG. 10B illustrates an example of the spectral power density of the primary colors included in a second set of primary colors.

When the display device transitions from an environment where it is illuminated by D65 illuminant to an environment where it is illuminated by a front light including a white LED light source, a second set of seven different primary colors can be selected. FIG. 10B illustrates an example of the spectral power density of the primary colors included in the second set. The primary colors included in the second set of primary colors are obtained by adjusting the gap heights of at least some of the primary colors in the first set such that the overall color performance of the display element when illuminated by the front light including a white LED light source with the SPD of the front light represented by curve 910 and the SPD is perceptually similar to the color performance of the display element with the gap heights in the first set and illuminated by the D65 illuminant.

The second set includes a first primary color having SPD represented by curve 1020a that has a peak in the violet region of the visible spectrum; a second primary color having SPD represented by curve 1020b that has a peak in the blue region of the visible spectrum; a third primary color having SPD represented by curve 1020c that has a peak in the green region of the visible spectrum; a fourth primary color having SPD represented by curve 1020d that has a peak in the orange region of the visible spectrum; a fifth primary color having SPD represented by curve 1020e that has a peak in the red region of the visible spectrum; a sixth primary color having SPD represented by curve 1020f that has a peak in the magenta/purple region of the visible spectrum, and a seventh primary color having SPD represented by curve 1012b that is relatively flat in the visible spectrum and represents the white primary color.

A comparison of FIGS. 10A and 10B indicates that the shift in wavelength between the primary colors in the second set and the corresponding primary colors in the first set is not consistent. For example, the first primary color in the second set having a SPD represented by curve 1020a has a peak wavelength between about 450 nm and 475 nm while the first primary color in the first set having a SPD represented by curve 1010a has a peak wavelength between about 440 nm and 450 nm corresponding to a wavelength shift of about 15-30 nm. In contrast, the shift in the wavelength of the fifth primary color in the second set having a SPD represented by curve 1020e and the fifth primary color in the first set having a SPD represented by curve 1010e is between about 0-5 nm indicating that the fifth primary color in the second set is not shifted or shifted to a small extend as compared to the fifth primary color in the first set.

Figure 11A:
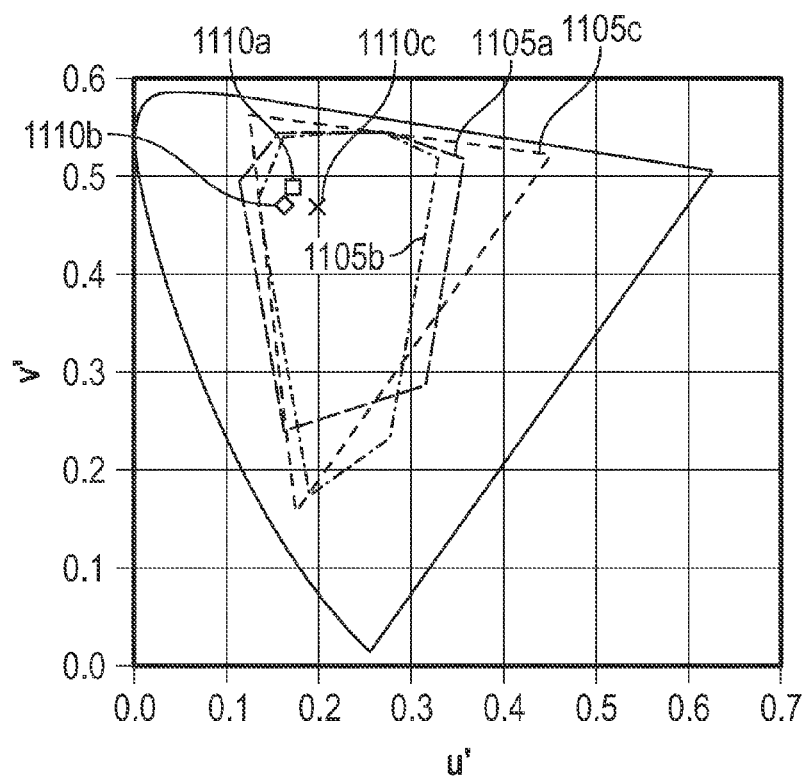
FIG. 11A illustrates an example of a color gamut corresponding to the first set of primary colors.

FIG. 11A illustrates an example of a color gamut 1105a resulting from the primary colors of the first set shown in FIG. 10A illuminated by a D65 light source and its corresponding white point 1110a. Also shown in FIG. 11A are the sRGB gamut 1105c and its corresponding white point 1110b, the color gamut 1105b resulting from the primary colors of the first set by illuminated by a white LED front light having a SPD represented by curve 910 and its corresponding white point 1110c. It is observed from FIG. 11A that some of the points in the gamut 1105b lie outside the gamut 1105a, and vice versa. This indicates that some primary colors (e.g., blue-violet region of the visible spectrum) will appear different when the illumination is changed from the D65 illuminant to a white LED light source.

Figure 11B:
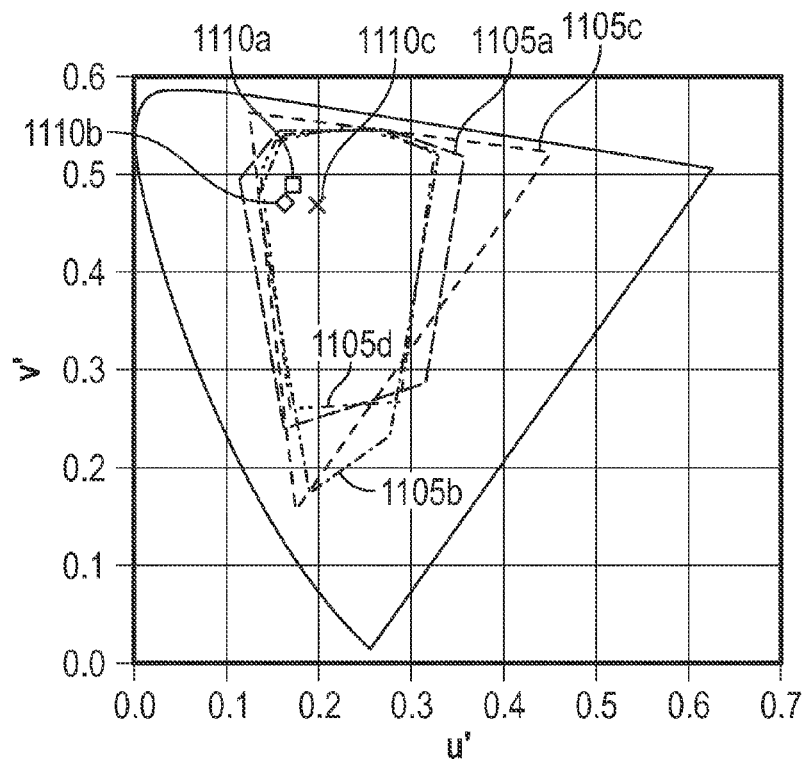
FIG. 11B illustrates an example of a color gamut corresponding to the second set of primary colors.

FIG. 11B illustrates an example of a color gamut 1105d resulting from the primary colors of the second set shown in FIG. 10B illuminated by a front light including a white LED light source. It is noted from FIG. 11B that the majority of color gamut 1105d overlaps with the color gamut 1105a indicating that an image displayed using the primary colors included in the second set and their combinations can have the same color appearance when illuminated by the white LED front light as an image displayed using the primary colors included in the first set and their combinations when illuminated by the D65 illuminant.

The primary colors included in the second set can be obtained by adjusting one or more device parameters, such as, for example, current, voltage or charge applied to the display element by circuits included in a driver (e.g. driving circuits 24 and 26 of the driver 22). The device parameters corresponding to the primary colors in the different sets of primary colors configured to be used under different illumination conditions can be saved in one or more look-up tables (LUTs) accessible by one or more processors (e.g., processor 21) associated with the display device. The display device can be configured to automatically select the appropriate set of primary colors based on the illumination condition.

For example, the device parameters (e.g., current, voltage or charge) corresponding to a first set of primary colors to be used when the display device is viewed outdoors in bright sunlight (corresponding to a D65 illuminant) without a front light can be stored in a LUT. The device parameters (e.g., current, voltage or charge) corresponding to a second set of primary colors to be used when the display device is viewed indoors and illuminated by a front light in addition to ambient can be stored in the LUT as well. The display device can be configured to detect the illumination state of the front light (e.g., whether the front light is on or off, the nature of illumination provided by the front light, etc.) and determine which set of primary colors is to be used. For example, one or more the processors (e.g., processor 21) associated with the display device can be connected to the front light circuit and are capable of detecting whether the front light is on or off. In such implementations, when the display device is viewed outdoors and the front light is turned off (either automatically or by the user viewing the display), the one or more processors can detect that the front light is turned off, access the LUT and use the device parameters that produce primary colors included in the first set to display one or more images. When the display device transitions from the outdoor setting to the indoor setting and the front light is turned on (either automatically or by the user viewing the display device), the one or more processors can detect that the front light is turned on, access the LUT and use the device parameters that produce primary colors included in the second set to display one or more images. In this manner, the one or more processors can be configured to select a set of primary colors based on the spectral content of light illuminating the display device automatically without requiring input from the user.

In various implementations, the display device can include a sensor (e.g., a color sensor, a spectral sensor, etc.) that is in electronic communication with the one or more processors. The sensor can measure the spectral (or color) properties, the brightness and other characteristics of the light illuminating the display device. In such implementations, the one or more processors can be configured to (i) analyze the information obtained from the sensor; and (ii) select device parameters that correspond to a set of primary colors stored in the LUT that is optimized for input light having spectral properties and other characteristics similar to the spectral properties and characteristics measured by the sensor.

In various implementations, the one or more processors associated with the display device can be configured to compute the device parameters that would provide the primary colors optimized for the spectral properties and other characteristics of the light illuminating the display device "on-the-fly" based on the information provided by the sensor. For example, the one or more processors can be configured to calculated a weighted combination of the different primary colors included in the first set to be used when the display device is illuminated with a D65 illuminant without a front light and the different primary colors included in the second set to be used when the display device is illuminated with a front light (e.g., a white LED) depending on the overall amount of ambient light. Such implementations can be advantageous in maintaining consistent color performance when the display device is illuminated by a combination of ambient light and front light (e.g., outdoors on a cloudy day, indoors lit by indoor lighting devices, etc.)

In various implementations, the display device can include a feedback loop including one or more sensors can be provided to dynamically adjust the device parameters to maintain a consistent color performance of the display device under different illumination conditions.

In various implementations, the one or more processors can be configured to select different dithering schemes in addition to selecting different primary colors for different lighting conditions. For example, the one or more processors can be configured to display an image by using a first dithering scheme applied to the primary colors in the first set when illuminated by a D65 illuminant and a second dithering scheme applied to the primary colors in the second set when illuminated by a front light including a white LED. The first and the second dithering schemes can be selected by reducing or minimizing a color difference in a color space (e.g., CIELAB color space) between the dithered colors when illuminated by the D65 illuminant and the front light. In various implementations, the one or more processors can be configured to select different dithering schemes based on the information obtained from the sensor.

Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time. For example, in some implementations the display device may be capable of producing a large number of primary colors (e.g., 6 or more primary colors) for different lighting conditions and a physical computing device may be necessary to select the appropriate combinations of primary colors to be used from the large number of possible colors that is appropriate for a certain lighting condition. Accordingly, various implementations of the methods described herein can be performed by a hardware processor included in the display device (for example, the processor 21, the driver controller 29, and/or the array driver 22 described below with reference to the display device of FIGS. 13A and 13B). To perform the methods described herein, the processor can execute a set of instructions stored in non-transitory computer storage. The processor can access a computer-readable medium that stores the indices for the primary colors and/or the last input image. Various other implementations of the methods described herein can be performed by a hardware processor included in a computing device separate from the display device. In such implementations, the outputs of the methods can be stored in non-transitory computer storage and provided for use in a display device.

Figure 12:
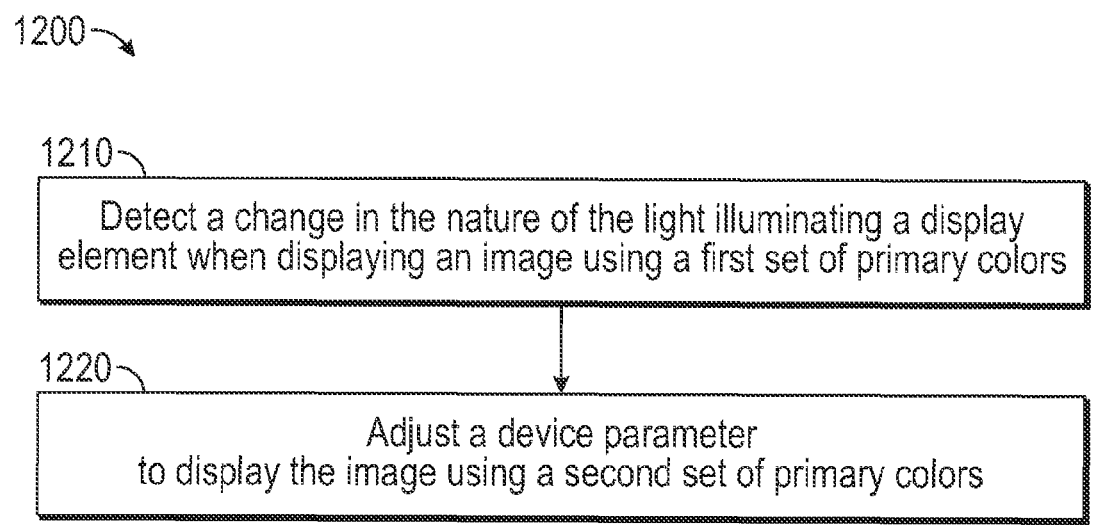
FIG. 12 is a flowchart that illustrates an example of a method of displaying an image on a display element under different illumination conditions.

FIG. 12 is a flowchart that illustrates an example of a method 1200 of displaying an image on an implementation of a display device including at least one display element (e.g., an IMOD or an AIMOD 900) under different illumination conditions. The image can include a plurality of image pixels and a plurality of input colors. As discussed above, the at least one display element can be configured to display the image by using a first set of N adjustable primary colors and their combinations when illuminated by a first illumination source. The number (N) of primary colors in the first set can be between 4 and 256. For example, the number (N) of primary colors in the first and the second set can be at least 4, at least 6, at least 8, at least 16, at least 32 or at least 128. In various implementations, the first set of N adjustable primary colors can be selected such that a volume of the first set of N adjustable primary colors displayed by the at least one display element when illuminated by the first illumination source in a color space (e.g., CIELAB color space) is maximized. In various implementations, the first set of N adjustable primary colors can be selected such that a 2D color gamut area enclosed by the N adjustable primary colors in the first set when illuminated by the first illumination source is maximized.

The method 1200 includes detecting a change in the nature of the light illuminating the at least one display element when displaying an image using a first set of primary color, as shown in block 1210. The display device can include one or more electronic processing circuits (e.g., processor 21) that can be configured to detect a change in the nature of the light illuminating the display element. For example, as discussed above, the one or more electronic processing circuits can be configured to detect a change in the status of a front light (e.g., detect whether a front light is turned on or off or a level of the illumination provided by the front light). As another example, the one or more electronic processing circuits can be configured to detect a change in the nature of the light illuminating the display element by obtaining information from a sensor (e.g., a color sensor, a spectral sensor, etc.) associated with the display device. The information obtained from the sensor can include information related to the spectral characteristic and/or brightness of the light illuminating the display element.

In response to detecting a change in the nature of the light illuminating the at least one display element, the method 1200 further includes adjusting a device parameter of the display element to display the image using a second set of primary colors, as shown in block 1220. As discussed above, the primary colors in the second set can be obtained by varying one or more device parameters (e.g., a voltage, a current or a charge applied to the display element) associated with a corresponding primary color in the first set. As discussed above, the primary color in the second set are perceptually similar to the corresponding primary color in the first set such that a color difference between the primary colors in the first set and the primary colors in the second set is below a threshold (e.g., less than 2.3 in the CIELAB color space).

In various implementations, the primary colors in the first and the second set can be pre-computed and stored in a LUT. The one or more electronic processing circuits can be configured to access the LUT and select the appropriate set of primary colors in response to detecting a change in the nature of the light illuminating the at least one display element. In some implementations, the one or more electronic processing circuits can be configured to dynamically calculate the optimized primary colors for light having a certain spectral property and/or brightness based on the information obtained from the sensor and change the device parameters to produce the calculated optimized primary colors.

The method 1200 can be performed in its entirety by a physical computing device. The computing device can include a hardware processor and one or more buffers. In various implementations, the method 1200 can be performed by the processor 21, the driver controller 29, or the array driver 22 of the display device 40 described below. A non-transitory computer readable storage medium can include instructions that can be executed by a processor in a physical computing device to perform the method 1200. In various implementations, the computing device and/or the non-transitory computer readable storage medium can be included with a system that includes a display device including a plurality of IMOD display elements including but not limited to implementations similar to AIMOD 900.

Figure 13A:
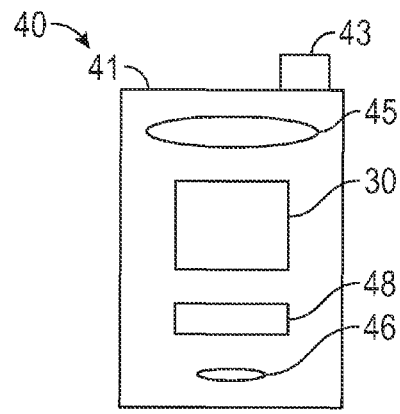
FIGS. 13A and 13B are system block diagrams illustrating a display device that includes a plurality of IMOD display elements.
Figure 13B:
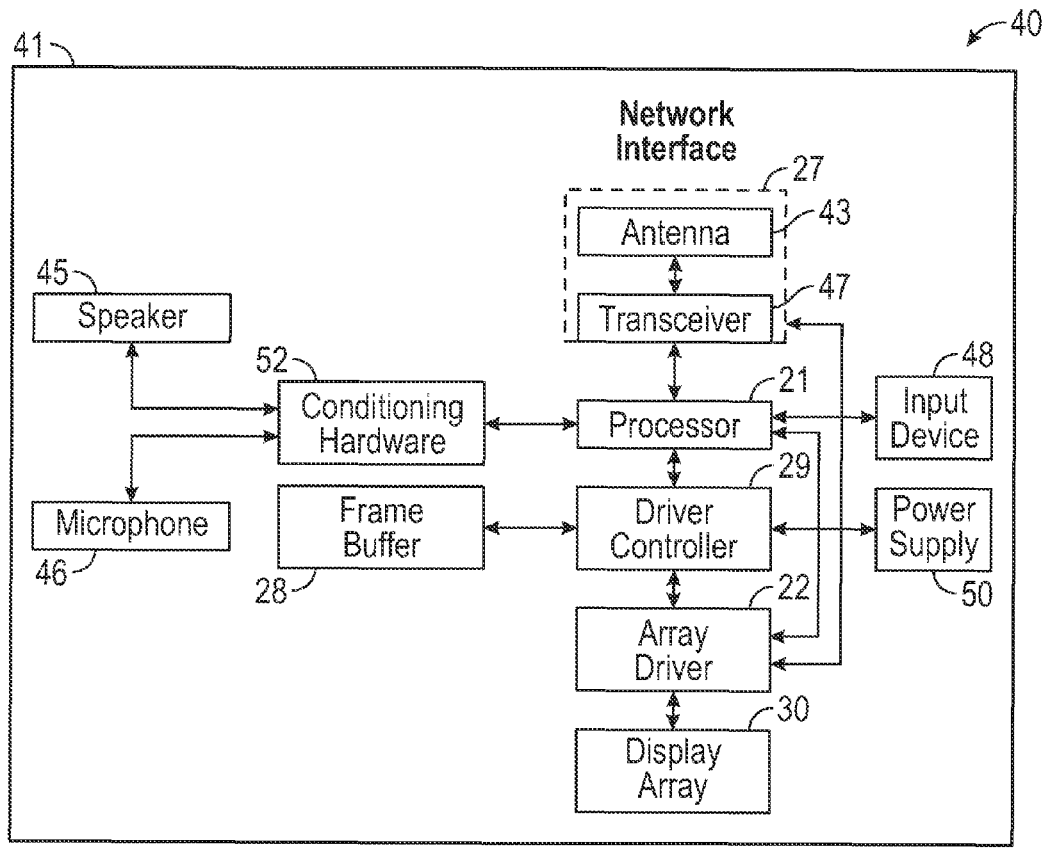

FIGS. 13A and 13B are system block diagrams illustrating a display device 40 that includes a plurality of IMOD display elements including but not limited to implementations similar to AIMOD 900. The display device 40 can be configured to use temporal (and/or spatial) modulations schemes that utilize the constrained color palette disclosed herein. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 13A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 13A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level. The processor 21 (or other computing hardware in the device 40) can be programmed to perform implementations of the methods described herein such as the methods 1200. The processor 21 (or other computing hardware in the device 40) can be in communication with a computer-readable medium that includes instructions, that when executed by the processor 21, cause the processor 21 to perform implementations of the methods described herein such as the method 1200.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). The driver controller 29 and/or the array driver 22 can be an AIMOD controller or driver. In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described methods for generating a constrained color palette may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display device comprising:
at least one display element configured to display a first set of at least four adjustable primary colors in a color space associated with the display device when under illumination by a first illumination source, the first illumination source being ambient light, the at least four adjustable primary colors associated with at least four different values of a device parameter of the display element that can be adjusted to provide the first set of at least four adjustable primary colors;
a front light source configured to illuminate the at least one display element; and
a processor configured to:
detect a change in the nature of the illumination when the at least one display element is illuminated by light from the front light source; and
adjust at least some of the at least four different values of the device parameter such that the display element is configured to display a second set of at least four adjustable primary colors in the color space associated with the display device when illuminated by light from at least the front light source,
wherein the second set of at least four adjustable primary colors displayed by the display element when illuminated by light from at least the front light source is perceptually similar to the first set of at least four adjustable primary colors when illuminated by light from the first illumination source.

2. The display device of claim 1, wherein the values of the device parameters corresponding to the at least four adjustable primary colors in the first set and the at least four adjustable primary colors in the second set are stored in a look-up table (LUT) accessible by the processor.

3. The display device of claim 1, wherein the processor is configured to detect a change in the nature of illumination by determining an illumination state of the front light source.

4. The display device of claim 1, wherein the display element includes a movable reflective layer disposed over a substrate, the movable reflective layer spaced apart from the substrate by a gap.

5. The display device of claim 4, wherein the device parameter corresponds to a height of the gap.

6. The display device of claim 1, wherein each of the at least four adjustable primary colors in the first set has a corresponding primary color in the second set such that a color different $\Delta C$ in a standard color space between a primary color in the first set having a color value $C_{1N}$ in the standard color space and a corresponding primary color in the second set having a color value $C_{2N}$ in the standard color space is less than a threshold value.

7. The display device of claim 1, further comprising a sensor in electronic communication with the processor, the sensor configured to sense the nature of the illumination source.

8. The display device of claim 7, wherein the sensor includes a color sensor.

9. A method of displaying image data on a display device including at least one display element, the at least one display element configured to display a first set of at least four adjustable primary colors in a color space associated with the display device when under illumination by light from a first illumination source, the first illumination source being ambient light, the at least four adjustable primary colors associated with at least four different values of a device parameter of the at least one display element that can be adjusted to provide the first set of at least four adjustable primary colors, the method comprising:
under control of an electronic processing circuit associated with the display device:
detecting a change in the nature of the illumination when the at least one display element is illuminated by light from at least a front light source associated with the display device; and adjusting at least some of the at least four different values of the device parameter such that the display element is configured to display a second set of at least four adjustable primary colors in the color space associated with the display device when illuminated by light from at least the front light source, wherein the second set of at least four adjustable primary colors displayed by the display element when illuminated by light from at least the front light source is perceptually similar to the first set of at least four adjustable primary colors when illuminated by light from the first illumination source.

10. The method of claim 9, wherein detecting a change in the nature of the illumination includes determining an illumination state of the front light source associated with the display device.

11. The method of claim 9, wherein detecting a change in the nature of the illumination includes sensing a change in the spectral content of light illuminating the at least one display element.

12. The method of claim 9, wherein adjusting some of the at least four different values of the device parameter includes accessing a look-up table (LUT) accessible by the electronic processing circuit to obtain at least four different values of the device parameters corresponding to the at least four adjustable primary colors in the second set.

13. The method of claim 9, wherein the display element includes a movable reflective layer disposed over a substrate, the movable reflective layer spaced apart from the substrate by a gap, wherein the device parameter is a height of the gap, and wherein adjusting the at least four different values of the device parameter includes changing a value of an electrical signal applied to the display element to adjust the height of the gap.

14. The method of claim 9, wherein adjusting the at least four different values of the device parameter includes sensing a change in a spectral content of the light illuminating the at least one device element and changing the device parameters of at least some of the display elements to generate a second set of at least four adjustable primary colors.

15. A non-transitory computer storage medium comprising instructions that when executed by a processor cause the processor to perform a method of displaying image data on a display device including at least one display element, the at least one display element configured to display a first set of at least four adjustable primary colors in a color space associated with the display device when under illumination by light from a first illumination source, the first illumination source being ambient light, the at least four adjustable primary colors associated with at least four different values of a device parameter of the at least one display element that can be adjusted to provide the first set of at least four adjustable primary colors, the method comprising:
    under control of an electronic processing circuit associated with the display device:
        detecting a change in the nature of the illumination when the at least one display element is illuminated by light from at least a front light source associated with the display device; and
        adjusting at least some of the at least four different values of the device parameter such that the display element is configured to display a second set of at least four adjustable primary colors in the color space associated with the display device when illuminated by light from at least the front light source, wherein the second set of at least four adjustable primary colors displayed by the display element when illuminated by light from at least the front light is perceptually similar to the first set of at least four adjustable primary colors when illuminated by light from the first illumination source.

16. The non-transitory computer storage medium of claim 15, wherein detecting a change in the nature of the illumination includes determining an illumination state of the front light source associated with the display device.

17. The non-transitory computer storage medium of claim 15, wherein detecting a change in the nature of the illumination includes sensing a change in the spectral content of light illuminating the at least one display element.

18. The non-transitory computer storage medium of claim 15, wherein adjusting at least some of the at least four different values of the device parameter includes accessing a look-up table (LUT) accessible by the electronic processing circuit to obtain values of the device parameters corresponding to the at least four adjustable primary colors in the second set.

* * * * *